United States Patent [19]

Schabert et al.

[11] 4,245,412
[45] Jan. 20, 1981

[54] STEAM POWER PLANT, ESPECIALLY NUCLEAR POWER PLANT

[75] Inventors: Hans-Peter Schabert, Erlangen; Erwin Laurer, Möhrendorf, both of Fed. Rep. of Germany

[73] Assignee: Kraftwerk Union Aktiengesellschaft, Mulheim, Fed. Rep. of Germany

[21] Appl. No.: 881,176

[22] Filed: Feb. 27, 1978

[30] Foreign Application Priority Data

Feb. 28, 1977 [DE]  Fed. Rep. of Germany ....... 2708642
Sep. 9, 1977 [DE]  Fed. Rep. of Germany ....... 2740761

[51] Int. Cl.³ ............................................. F22B 37/44
[52] U.S. Cl. ..................................... 137/357; 176/38; 176/87; 248/49
[58] Field of Search .................. 137/357, 360; 176/38, 176/87; 248/49, 56

[56] References Cited

U.S. PATENT DOCUMENTS

| 4,060,453 | 11/1977 | Schabert et al. | 176/38 |
| 4,066,498 | 1/1978 | Hoffmann et al. | 176/38 |
| 4,092,490 | 5/1978 | Schabert et al. | 176/87 X |
| 4,098,476 | 4/1978 | Jutte et al. | 248/49 X |

Primary Examiner—Gerald A. Michalsky
Attorney, Agent, or Firm—Herbert L. Lerner

[57] ABSTRACT

Steam power plant having a steam line passing through a wall, and a valve disposed in the course of the steam line and formed with a housing, includes a plurality of additional valve fittings connected adjacent one another to the housing of the valve, each of the valve fittings having a smaller nominal diameter than that of the valve and having a respective housing joined to the valve housing and connected to respective additional lines downstream from the valve, the locations at which the valve housing and the respective housings of the valve fittings are joined having a bending resistance moment that is at least double the bending resistance moment of the additional lines.

12 Claims, 7 Drawing Figures

STEAM POWER PLANT, ESPECIALLY NUCLEAR POWER PLANT

The invention relates to a steam power plant, especially a nuclear power plant, having a steam line passing through a wall and a valve which is disposed in the course of the steam line and having a housing which is connected to the housing of a further valve or valve fitting.

In a pressurized-water reactor, heretofore known from German Patent DT-PS No. 2 403 668, the further valve or valve fitting following or connected downstream from the first valve is a safety valve which, in turn, is connected to a blowdown gate valve. All of the valves or valve fittings are disposed in a row, so that the apertures form a straight pipe. The cross section of this pipe and of the blowdown or dump line starting out from the last valve or valve fitting corresponds approximately to the cross section of the steam line which is fastened in the wall and, in turn, carries all the valves or valve fittings.

It is an object of the invention to provide a steam power plant of the foregoing type wherein the valves or valve fittings which are required in connection with the steam line of the foregoing type, are made so strong with a minimum of mechanical means that, with certainty, no leak can occur in the vicinity of the valves or valve fittings even if a break in the outgoing dump or blowdown line should occur and large bending moments be caused thereby. This is particularly important because such a leak can often no longer be shut off by preceding valves or valve fittings and could therefore cause great consequent damage.

With the foregoing and other objects in view, there is provided, in accordance with the invention, steam power plant having a steam line passing through a wall, and a valve disposed in the course of the steam line and formed with a housing, comprising a plurality of additional valve fittings connected adjacent one another to the housing of the valve, each of the valve fittings having a smaller nominal diameter than that of the valve and having a respective housing joined to the valve housing and connected to respective additional lines downstream from the valve, the locations at which the valve housing and the respective housings of the valve fittings are joined having a bending resistance moment that is at least double the bending resistance moment of the additional lines.

In the invention of the instant application, the valves or valve fittings are no longer connected in series, since they are mounted adjacent one another on the first valve. This reduces the mechanical stress of the steam line and the valve considerably, because the bending forces transmissible to the valve, even if they are to be exerted by all the additional valve fittings simultaneously are smaller than is possible in the heretofore known construction with the large lever arms thereof. To this should be added that the mounting of additional valve fittings adjacent one another, results in a spatial distribution of the loads, since the forces are introduced far more uniformly and, therefore, more advantageously than in the serial disposition provided in the heretofore known configuration.

In the case of a safety valve, the smaller structure of the "after-connected" valves or valve fittings can simultaneously produce a throttling effect, with the consequence that the amount of steam escaping, when blowing down or relieving overpressure, does not become unduly larger than is presupposed in normal operation due to the higher resistance of the after-connected turbine. Such a throttling effect may advantageously also be variable in stages if the blowdown cross section extending from the valve is formed by further parallel valves or valve fittings of small cross section, as will be discussed hereinafter in greater detail.

In accordance with another feature of the invention, the bending resistance moment of the locations at which the valve housing and the housings of the valve fittings are joined and the bending resistance moment of the additional lines are in a ratio of from 4 to 10:1. This assures that the stress of the joint or connecting location between the valve and the additional valve fittings remains at a safe low value, even if, in the case of an unfavorable location of the break in the relief or blowdown line, the effect of the resulting thrust or transverse force is added to the cocalled fully-plastic bending moment in the relief or blowdown line.

In accordance with a further feature of the invention, the valve is an angle valve, and the valve fittings are at least three in number and are also in the form of angle valves connected to the first-mentioned angle valve in a substantially uniform distribution thereon and in the course of the steam line. The valve fittings can be disposed relatively close together without mutual hindrance of the connected lines, as will be set forth in detail hereinafter with reference to an embodiment of the invention.

In accordance with an added feature of the invention, the additional lines are surrounded by respective pipes open at one end thereof. In the case of an assumed break of such a line, this construction has the advantage that the then escaping steam jet does not strike the controls of the valve fittings, and the operability thereof is not lost. These double pipes are braced so that lateral movement of the lines is narrowly limited. The clearance or play should not be greater than about the thickness of the wall of the line. A considerable increase in the safety of the valve combination is thereby attained, at the same time taking into consideration necessary movements which are due to temperature changes.

In accordance with an additional feature of the invention, at the valve fittings, the pipes can be movably attached, and especially articulatingly attached. Then they no longer transmit bending moments to the valve fittings. In accordance with other features of the invention, the pipe extends advantageously up to a wall, through which the line passes and in which the pipe is supported with minimal lateral play. On the side of the wall facing away from the valve fittings, the line is, furthermore, provided with a bend. A redirection or diversion of an applied forece is thereby achieved, which prevents external forces from causing any appreciable tension in the line in the section thereof immediately connected to the valve fittings.

Another possibility of avoiding the undesired introduction of forces, for example, in the event of a line break, is to provide a compensator between the line and the valve fittings. Such a compensator i.e. a flexible section of line, in the form of a corrugated pipe, for example, transmits only small lateral forces, so that the stress of the valve fitting due to the connected line is kept suitably small.

The construction and shape of the additional valve fittings connected to the valve are, in themselves, largely arbitrary inasmuch as an advantageous disposition is always obtained with the technical teachings of the invention insofar as spatial requirements and mechanical stresses are concerned. It is especially advantageous, however, if at least some of the additional valve fittings are safety valves with varying nominal diameters. As already indicated hereinabove, it is thereby possible to make particularly advantageous adjustments to the varying relief lines which are required in steam power plants when shutting down, without having to use a series connection of a shut-off valve with a control valve. The valves can open in stages together, or can each be opened individually in accordance with the invention.

A further improvement, in the sense that manufacture is facilitated and costs reduced, is effected in accordance with a further feature of the invention, wherein the housings of the valve fittings are formed of pipe unions radiating outwardly from the valve housing and being formed with respective flanges disposed transversely to the direction in which the pipe unions radiate outwardly. Thus, the additional valve fittings are no longer provided with quasi-independent housing parts which, while connected to the first valve housing, are otherwise independent. What is obtained, rather, is an integrated construction with even greater strength, with respect to the wall thickness, and with the possibility of fitting the movable parts even better than heretofore into the valve housings. In addition, even shorter line connections are obtained, which results in correspondingly shorter lever arms for bending forces that may develop, for example, as a consequence of line breaks. The pipe stubs or unions, in the sens of the invention, are tubular and, in particular, cylindrical protruberances extending from the housing of the first and largest valve of the steam line, and which virtually have the same cross section over the entire length thereof.

In accordance with yet a further feature of the invention, the valve fittings have movable members, and including guide members disposed in the pipe unions for guiding the movable members, and bosses secured to the pipe unions and bracing the guide members.

In accordance with a concomitant feature of the invention, the guide members are disposed within the pipe unions coaxially to the respective pipe unions.

Other features which are considered as characteristic for the invention are set forth in the appended claims.

Although the invention is illustrated and described herein as embodied in a steam power plant, especially nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
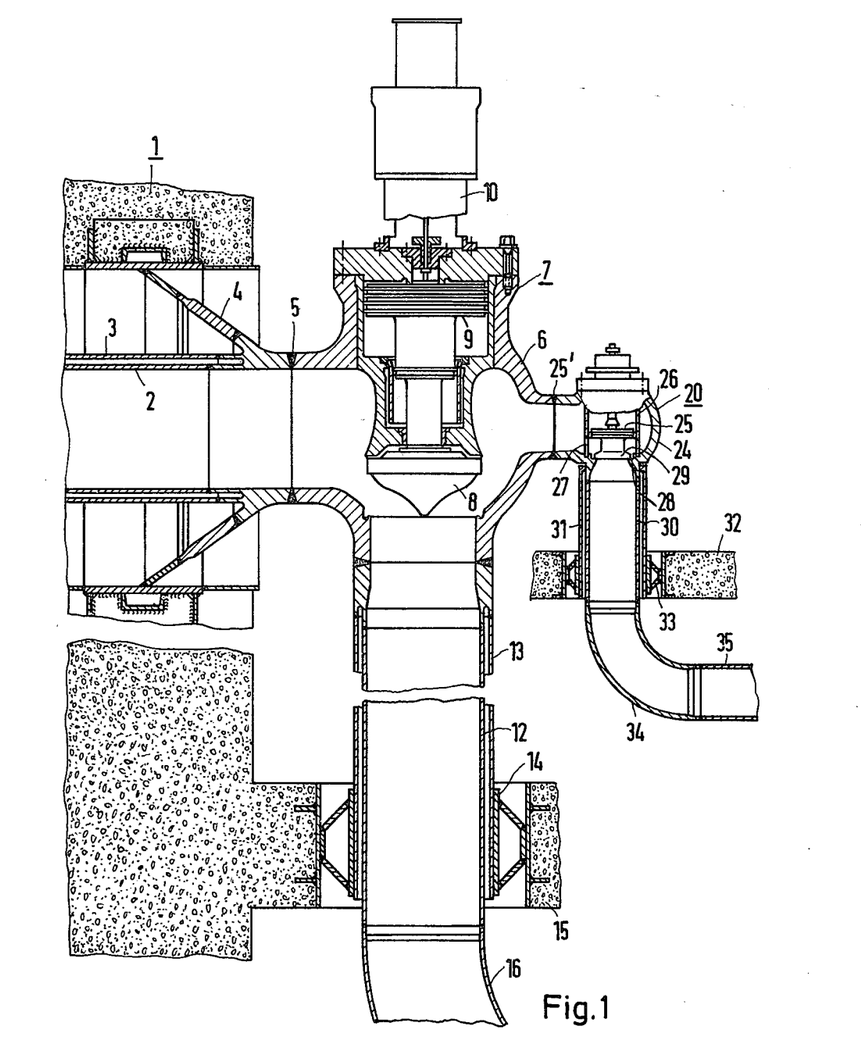
FIG. 1 is a plan view, partly broken away and partly in section, of a steam line extending from a nuclear power plant in accordance with the invention.

Referring now to the drawing and first, particular, to FIG. 1 thereof, it is noted that a nuclear power plant with a pressurized water reactor of, for example, 1300 MWe is generally enclosed, in a conventional manner, within a containment shell that is surrounded by a secondary shield of which only a section 1 is visible in FIG. 1 and is penetrated by a steam line 2 extending in horizontal direction. The steam line 2 with a nominal diameter of, for example, 700 mm extends without a valve from a non-illustrated steam generator of the pressurized-water reactor and is constructed in the form of a double pipe 3 in the region of the secondary shield 1, and is held thereat in a conical support member 4, as is disclosed in application Ser. No. 700,910 filed June 29, 1976, now U.S. Pat. No. 4,092,490. The support member 4 is fastened in the secondary shield 1, so that a base for the line 2 is provided.

Outside the secondary shield 1, a joint or connecting location 5 for the housing 6 for a quick-acting gate valve, identified generally by the reference numberal 7, is disposed in the course of of flow path within the steam line 2. The valve 7 is an angle valve. It has a movable valve plate or disc 8 which is connected to a piston 9 and actuated by a drive 10. The housing 6 is a forging having great mechanical strength. At the joint 5, the wall thickness is, for example, 90 mm. This produces a bending resistance moment of about 50,000 cm$^3$.

A line section 12 of the steam line 2 having a nominal diameter of about 700 mm, and extending vertically downwardly from the valve 7 is, in turn, constructed as a double pipe. The outer pipe 13 of the line 12 leads to a support 14 which is provided in a horizontal wall 15. The line 12 then forms a 90° elbow 16. As shown, the free end of the outer pipe 13 is open. Thus, the line 12 can expand without the exertion or application of any forces upon the valve 7. The wall thickness of the inner pipe of the line 12 is 14 mm. A bending resistance moment or section modulus of 5300 cm$^3$ results therefrom.

Figure 2:
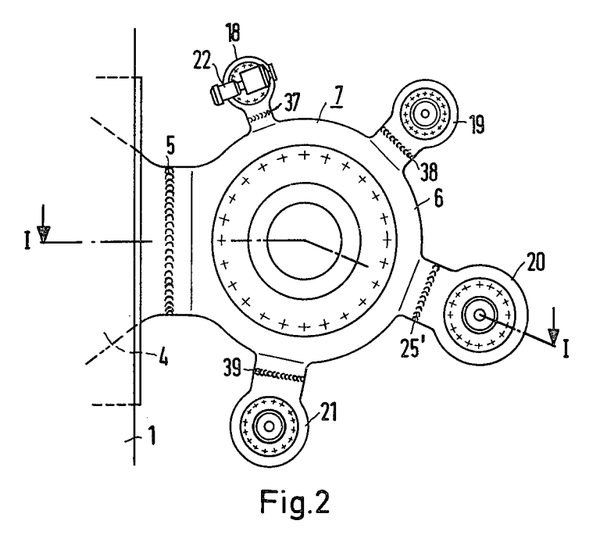
FIG. 2 is a top plan view of FIG. 1.

As can clearly be seen in FIG. 2, four additional valves 18 to 21 are directly connected to the housing 6 of the valve 7, with uniform lateral distribution. These additional valves are a preheating valve 18 which, for example, has a nominal diameter of 100 mm, a safety valve 19 which, for example, has a nominal diameter of 200 mm, a safety valve 20 with, for example, a nominal diameter of 300 mm and another safety valve 21, the nominal diameter of which is 250 mm, for example.

The pre-heating valve 18 is equipped with a drive 22, by which it can be opened and closed by remote control. What is sought to be achieved thereby is to permit a small amount of steam to get into the line section 12, bypassing the valve 7, prior to starting the operation of the turbine, so that the line section 12 connected downstream of or following the valve 7 is heated up by the small amount of steam and is pressurized. This facilitates the opening of the valve 7.

The safety valves 19 to 21 are of identical design. The conventional construction thereof is readily recognizable from FIG. 1. As is evident from the vertical sectional view of the valve 20 in in FIG. 1, the valve housing 24 formed of forged steel is welded with a joint 25' directly to the valve housing 6. In the housing 24, a piston 25 is guided in a tube 26 formed with cutouts or openings 27 therein. The cutouts 27 lead to a valve seat 28 which, in the position shown in FIG. 1, is closed off by a valve plate or disc 29. The pressure of the steam in the main steam line 2 accordingly acts upon the piston 25 in a direction to open the same i.e. upwardly. Acting in the opposite direction thereto, a force, which can be applied by a spring or another medium, for example hydraulically, determines the opening pressure.

A relief or blow-down line 30 is connected to the housing 24 and is constructed as a double pipe by means of the addition of an outer pipe 31 which extends to the vicinity of a horizontal partition 32. The pipe 31 is articulatingly braced at the housing 24 of the valve 20, as is shown in FIG. 1. The bracing 33 therefor in the partition 32 is effected with minimal lateral play, like a bracing 14 for the outer pipe 13 of the line 12. On the side of the wall 32 facing away from the valve 20, a 90°-elbow 34 is provided, from which the line section 35 leads to a non-illustrated sound absorber or muffler. In this case, too, the pipe 31 is open at the free end thereof, so that no large forces can be exerted by the relief or blow-down line 30 upon the valve 20.

Contrary to the nominal diameter of 700 mm at the steam line 2, the nominal diameter of the safety valve 20 is 300 mm. This applies, as well, to the joint 25 and to the line sections 30, 34 and 35 connected downstream of or following the valve 20. The bending resistance moment of the joint 25', for a diameter of 400 mm and a wall thickness of 50 mm, is about 4500 cm$^3$. If the pipeline 30 has a diameter of 324 mm and a wall thickness of 7.1 mm, a bending resistance moment of about 550 cm$^3$ is obtained. From this, it follows that the bending moments originating with the line sections 30, 34 and 35, as well as the bending moment which is transmissible through the joint 25', are several times smaller than the bending strength afforded by the joint 5 between the housing 6 and the bracing 4. It is already apparent from FIG. 1 that the considerably smaller wall thicknesses of the line sections 30, 34 and 35 also must result in a bending resistance moment or section modulus that is several times smaller than that of the joint 25'. This means that the course of the steam line 2 can never be in danger in the region of the quick-acting gate valve 7 for all conceivable bending loads.

The hereinaforedescribed construction applied to all the further valves or valve fittings 18, 19, 20 and 21 connected to the valve 7. The construction of the valves or valve fittings 18, 19, 20, 21 integral with the valve housing 6 is always sufficiently strong so that the lines connected thereto will break before the connection to the valve housing 6 is overstressed. The joints 25', 37, 38 and 39, which are in the form of welded seams, have a bending moment that is 4 to 10 times greater than the lines connected downstream therefrom.

The safety valves 19, 20 and 21 are constructed, in this order, for a blowdown capacity of 20, 50 and 30%. They can therefore remove individually the stated percentages or fractions of the steam and, taken together, they are capable of discharging 100% of the steam without difficulty. An advantageous metering of the relief or blow-down volume with decreasing steam pressure is thereby afforded, which prevents overloading of the steam generating plant or, for example, too-rapid cooling of the reactor.

Figure 3:
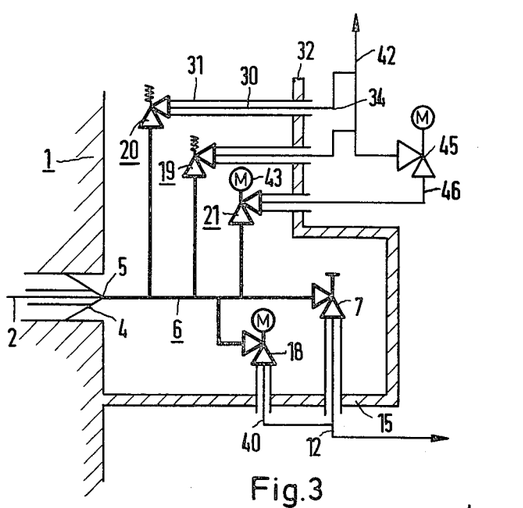
FIGS. 3 and 4 are simplified circuit diagrams of two different embodiments of pipeline systems in their entirety incorporating the invention.

In FIG. 3, the invention is explained further with the aid of a pipeline plan or layout. It is apparent therein that the live steam line 2 which passes through the wall 1 and is secured in the bracing member 4, is constructed, in the regions thereof illustrated in bolder lines, as a strong, pressure-tight forging, which corresponds to the housing 6 with the housings of the valve fittings 18 to 21 additionally connected thereto. Besides the shut-off or gate valve 7, the pre-heating valve 18 can be seen in FIG. 3. It has a flow-through cross section with a diameter of 100 mm. An outlet line 40 leads therefrom into that part 12 of the live steam line 2 which is situated behind or beyond the wall 15.

In the embodiment according to FIG. 3, one line with a diameter of 300 mm leads through the safety valve 20 to a relief or blow-down line 42 which is constructed with a diameter of 800 mm and to a non-illustrated sound absorber or muffler. It is apparent that, in this case also, the line section 30 behind or downstream of the safety valve 20 is protected by a double pipe 31 and that behind or beyond the wall 32, a bend 34 is provided in the line section 30. This bend 34 is essential in that when forces are applied behind or beyond the wall 32, no great tensile stresses can be exerted directly upon the valve 20, which might act with a lever arm as a bending moment upon the joint 5 at the bracing or support member 4.

Another line, likewise with a 300 mm diameter, leads to the relief or blowdown line 42 through a second safety valve 19 in the embodiment of the pipeline system of FIG. 3.

The third valve identified by the reference numeral 21 in conformance with FIG. 2 is provided in the form of a motor-operated shut-off valve with a nominal diameter of 250 mm (note the drive 43). A shut-off control valve 45 outside the wall 32 is associated with this valve 21 and is likewise connected to the relief or blowdown line 42. The relief or blowdown control valve 45 affords the controlled removal of heat in the form of steam in cases of trouble, should the normal heat sink i.e. the turbine with its condenser, have failed. Thus, with the disposition of a fixed valve in accordance with the invention, in association as a further valve fitting to the valve housing 6, assurance is provided that no impermissible or undue shutdown of the reactor will occur in the case of a disturbance. The line 46, after-connected or connected downstream of the valve 21 in FIG. 3, and which leads to the control valve 45, is of flexible construction.

Figure 4:
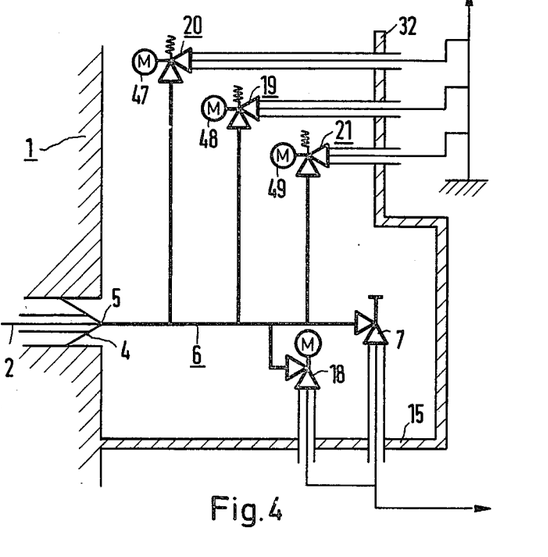

In the embodiment of the pipeline system according to FIG. 4, besides the preheating valve 18 connected to the housing 6 of the quick-acting gate or shut-off valve 7, three safety valves 20, 19 and 21 are also connected thereto and are additionally, adjustable, as indicated by the drives 47, 48 and 49. The safety valves 20, 19 and 21 have nominal diameters of 300, 250 and 200 mm, respectively. Together, they replace the relief or blow-down control valve shown in FIG. 3, since they can be controlled individually, so that a desired relief or blow-down capability or capacity can be attained in stages by opening one or more of the valves 19 to 21.

Figure 5:
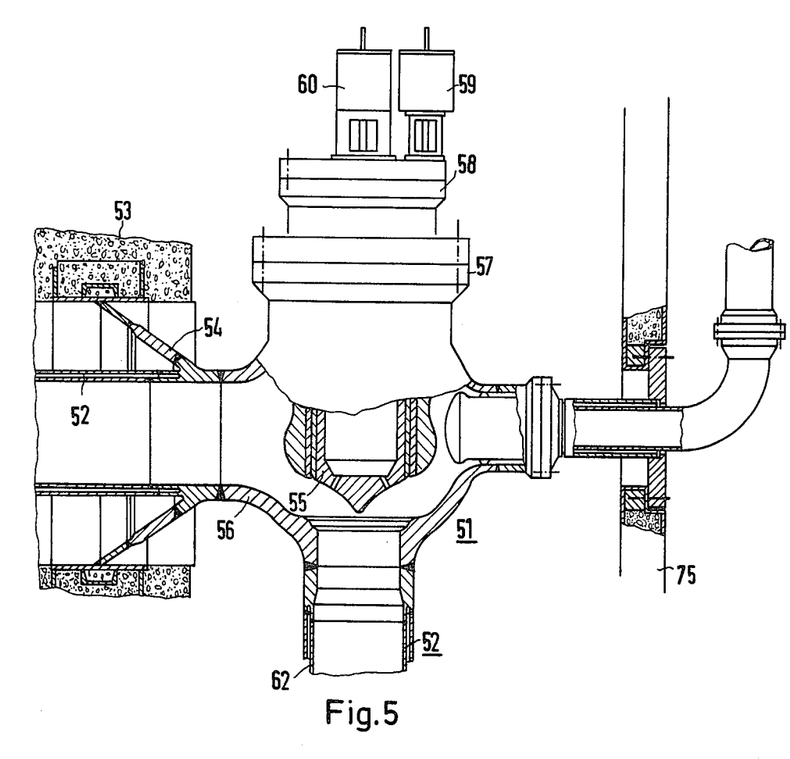
FIG. 5 is a view similar to that of FIG. 1 of another embodiment of the steam line extending from a nuclear power plant in accordance with the invention.

As is shown in FIG. 5, the valve combination 51 is disposed in the course or train of a live steam line 52 which, with a double-wall construction, passes through the secondary shield 53. The steam line 52 is braced at the secondary shield 53 by a conical bracing member 54.

In the live steam line 52, a shut-off valve 55 is disposed, the valve housing 56 of which is of substantially spherical shape. At the upper end of the valve housing 56, a drive 58 which is controlled by control magnets i.e. electromagnetic coils, 59 and 60, is fastened to a flange 57. Behind or downstream of the valve housing 56, the live steam line 52 is again constructed as a double-walled line section 62. The nominal diameter thereof is again 700 mm, as that of the preceding line section.

Figure 6:
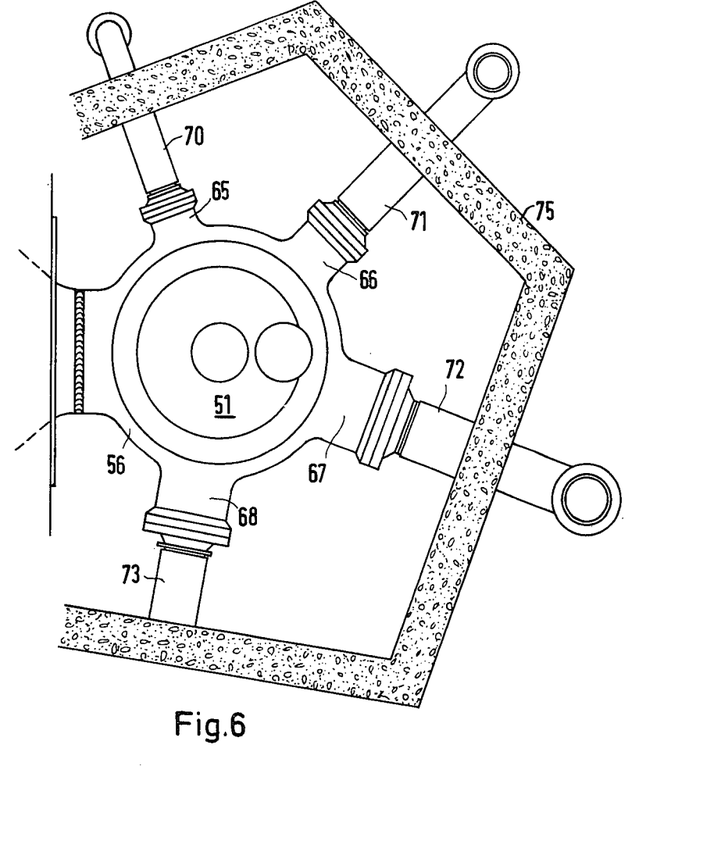
FIG. 6 is a top plan view of FIG. 5.

FIG. 6 shows four additional valve fittings 70 to 73 directly connected to the valve housing 56. These are a pre-heating valve 65, a safety valve 66 which is dimensioned for discharging 20% of the nominal steam quantity, a safety valve 67 which is dimensioned for removing 50% of the nominal steam quantity, and a safety valve 68, which is dimensioned for discharging 30% of the nominal steam quantity. The lines following or connected downstream of the valves 65 to 68 are identified by reference numerals 70, 71, 72 and 73. They pass through a wall 75 enclosing the valve combination and have a double-walled construction up to the vicinity of the wall 75, as shown in FIG. 5.

FIG. 6 shows especially clearly that the housings of the valves 65 to 68 are formed in a similar manner, for the most part of pipe unions, the ends of which, facing away from the valve housing 56, terminate in a respective flange. The respective outwardly extending line 75 is flanged thereto. The flange connection simultaneously permits the installation of the movable valve parts, as will be described hereinafter in greater detail with respect to FIG. 7. It is apparent from FIG. 7 that the valve housing 56 merges into radiating pipe stubs or unions 78 which extend in directions radial to the spherical housing 56; each pipe union 78 has a circular cross section and carries a flange 79 at the free end thereof. A valve housing cover 80 is connected to the flange through necked-down bolts 81, so that a valve housing 56 with a closed interior is produced, the cover 80 being situated as an adapter between the valve housing 56 and the outwardly extending line 75.

Figure 7:
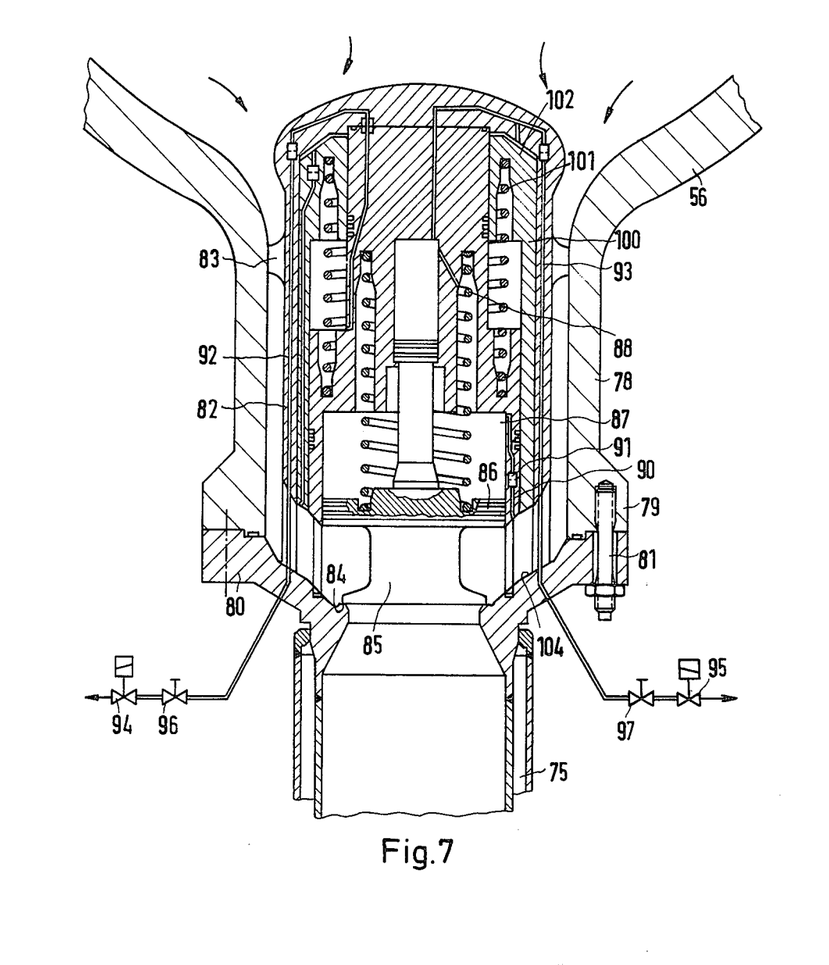
FIG. 7 is a fragmentary enlarged sectional view, partly diagrammatic, of FIG. 5, rotated clockwise through 90° and showing a detail thereof.

With a projection or shoulder 84, the cover 80 forms a valve seat for a movable valve plate or disc 85, which is movably guided with a piston 86 in a cylinder 87 in direction of the longitudinal axis of the pipe joint or stub 78. The piston 86 is subject to the action of a closing spring 88, which pushes the valve plate or disc 85 into the closed position of the valve. Pressure fluid is admitted to the cylinder 87 through a channel 90, the flow resistance of which can be varied by a throttle 91. Two further channels 92 and 93 lead to conventional electromagnetic valves 94 and 95, which are disposed outside the valve housing 82 and are preceded by shut-off valves 96 and 97. Normally, the shut-off valves 96 and 97 are open and the electromagnetic valves 94 and 95 are pressure-dependently controlled. The valve plate or disc 85 therefore acts as part of a safety valve.

In the respective pipe union or stub 78, a guide member 82 is mounted, which is braced in centered position by bosses 83. The guide body 82 contains, as a further movable valve member, a tubular slider 100 which is held by a spring 101 in the opened position illustrated in FIG. 7. With a piston-like enlargement 102 at the inner end of the slide 100, the latter can be actuated by a pressure medium. It then runs up against a valve seat 104, which is provided in the cover 80.

As can be seen, the invention of the instant application provides a strong construction of the housing of the additional valve fittings or valves 65 to 68 due to the structural combination thereof with the housing 56 of the main valve 7 in the form of pipe unions or stubs with minimal radial range or projection. The radial range or projection is approximately in the order of the magnitude of the outer diameter of the pipe unions or stubs. Nevertheless, the movable valve parts also of complex valves can be accommodated in these pipe unions. The fixed valve parts associated therewith i.e. the valve seats, are disposed in a cover connected to the flanges. This results in an advantageous possibility of assembling as well in an opportunity to effect repairs, should signs of wearing of the valve seats appear.

There are claimed:

1. Steam power plant having a steam line passing through a wall, and a valve disposed in the course of the steam line and formed with a housing, comprising a plurality of additional valve fittings connected adjacent one another to the housing of the valve, each of said valve fittings having a smaller nominal diameter than that of the valve and having a respective housing joined to the valve housing and connected to respective additional lines downstream from the valve, the locations at which the valve housing and the respective housings of the valve fittings are joined having a bending resistance moment that is at least double the bending resistance moment of said additional lines.

2. Steam power plant according to claim 1 wherein the bending resistance moment of said locations at which the valve housing and said housings of said valve fittings are joined and the bending resistance moment of said additional lines are in a ratio of from 4 to 10:1.

3. Steam power plant according to claim 1 wherein said valve is an angle valve, and said valve fittings are at least three in number and are also in the form of angle valves connected to said first-mentioned angle valve in a substantially uniform distribution thereon and in the course of the steam line.

4. Steam power plant according to claim 1 wherein said additional lines are surrounded by respective pipes open at one end thereof.

5. Steam power plant according to claim 4 wherein said open-ended pipes are movably braced.

6. Steam power plant according to claim 5 wherein the bracing for said open-ended pipes has an articulating connection.

7. Steam power plant according to claim 1 wherein said additional lines are surrounded by respective pipes open at one end thereof, and said pipes extend to a wall through which said additional lines pass.

8. Steam power plant according to claim 7 wherein said open-ended pipes are braced in said wall with minimal lateral play.

9. Steam power plant according to claim 1 wherein said housings of said valve fittings are formed of pipe unions of said valve housing, said pipe unions radiating outwardly from said valve housing and being formed with respective flanges disposed transversely to the direction in which said pipe unions radiate outwardly.

10. Steam power plant according to claim 9 wherein said valve fittings have movable members, said movable members being movable in direction of the longitudinal axis of the respective pipe unions.

11. Steam power plant according to claim 9 wherein said valve fittings have movable members, and including guide members disposed in said pipe unions for guiding said movable members, and bosses secured to said pipe unions and bracing said guide members.

12. Steam power plant according to claim 11 wherein said guide members are disposed within said pipe unions coaxially to the respective pipe unions.

* * * * *